United States Patent
Tanaka et al.

(10) Patent No.: US 9,898,027 B2
(45) Date of Patent: Feb. 20, 2018

(54) STATION BUILDING POWER SUPPLY DEVICE

(75) Inventors: Takeshi Tanaka, Tokyo (JP); Yasushi Matsumura, Tokyo (JP); Wataru Okuda, Tokyo (JP); Shuji Ishikura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 239 days.

(21) Appl. No.: 14/425,663

(22) PCT Filed: Sep. 5, 2012

(86) PCT No.: PCT/JP2012/072639
§ 371 (c)(1),
(2), (4) Date: Mar. 4, 2015

(87) PCT Pub. No.: WO2014/038020
PCT Pub. Date: Mar. 13, 2014

(65) Prior Publication Data
US 2015/0261247 A1    Sep. 17, 2015

(51) Int. Cl.
*G05F 3/04*      (2006.01)
*H02J 9/06*      (2006.01)
*H02M 7/44*      (2006.01)

(52) U.S. Cl.
CPC ............... *G05F 3/04* (2013.01); *H02J 9/062* (2013.01); *H02M 7/44* (2013.01); *Y10T 307/352* (2015.04)

(58) Field of Classification Search
CPC ............................ Y10T 307/352; G05F 3/04
(Continued)

(56) References Cited

U.S. PATENT DOCUMENTS

| 4,795,859 A | * | 1/1989 | Kato ..................... B60L 1/04 191/11 |
| 4,900,992 A | * | 2/1990 | Sekizawa .............. B60L 15/005 104/292 |

(Continued)

FOREIGN PATENT DOCUMENTS

| JP | 61-251437 A | * 11/1986 |
| JP | 8-33342 A | 2/1996 |

(Continued)

OTHER PUBLICATIONS

Office Action (Text of the First Office Action) dated May 23, 2016, by the Chinese Patent Office in corresponding Chinese Patent Application No. 201280075651.6, and an English Translation of the Office Action. (9 pages).

(Continued)

*Primary Examiner* — Rexford Barnie
*Assistant Examiner* — Joseph Inge
(74) *Attorney, Agent, or Firm* — Buchanan Ingersoll & Rooney PC

(57) ABSTRACT

A station building power supply device according to the present invention includes: a station building power generation unit including an inverter main circuit and an inverter control circuit to control the inverter main circuit, in which the inverter main circuit converts a voltage supplied from an overhead wire into a voltage required by loads in a station building; a control-circuit power generation unit that converts a voltage supplied to the loads in the station building and generates an input voltage for the inverter control circuit; and a start-up power generation unit that converts a voltage supplied from the overhead wire and generates an input voltage for the inverter control circuit, in a state where the inverter main circuit has stopped the operation and the control-circuit power generation unit has stopped an opera- (Continued)

tion of generating the input voltage for the inverter control circuit.

8 Claims, 1 Drawing Sheet

(58) Field of Classification Search
USPC .......................................................... 307/24
See application file for complete search history.

(56) References Cited

U.S. PATENT DOCUMENTS

| | | | | |
|---|---|---|---|---|
| 5,121,315 A | * | 6/1992 | Moriya | B60L 9/28 307/82 |
| 5,703,415 A | * | 12/1997 | Tanaka | G11C 5/141 307/66 |
| 7,728,456 B2 | * | 6/2010 | Kusubayashi | B60L 1/00 307/26 |
| 2002/0036483 A1 | * | 3/2002 | Kotani | H02J 3/38 322/28 |

FOREIGN PATENT DOCUMENTS

| | | |
|---|---|---|
| JP | 10-337064 A | 12/1998 |
| JP | 11-055957 A | 2/1999 |
| JP | 2001-347857 A | 12/2001 |
| JP | 2001-357867 A | 12/2001 |
| JP | 2001357867 A * | 12/2001 |

OTHER PUBLICATIONS

International Search Report (PCT/ISA/210) dated May 28, 2013, by the Japanese Patent Office as the International Searching Authority for International Application No. PCT/JP2012/072639.

Written Opinion (PCT/ISA/237) dated May 28, 2013, by the Japanese Patent Office as the International Searching Authority for International Application No. PCT/JP2012/072639.

Notice of Reasons for Rejection issued in Japanese Application No. 2014-534087, dated Jan. 21, 2015, with English translation.

Office Action (Patent Examination Report No. 1) dated Jul. 31, 2015, by the Australian Patent Office in corresponding Australian Patent Application No. 2012389227. (3 pages).

* cited by examiner

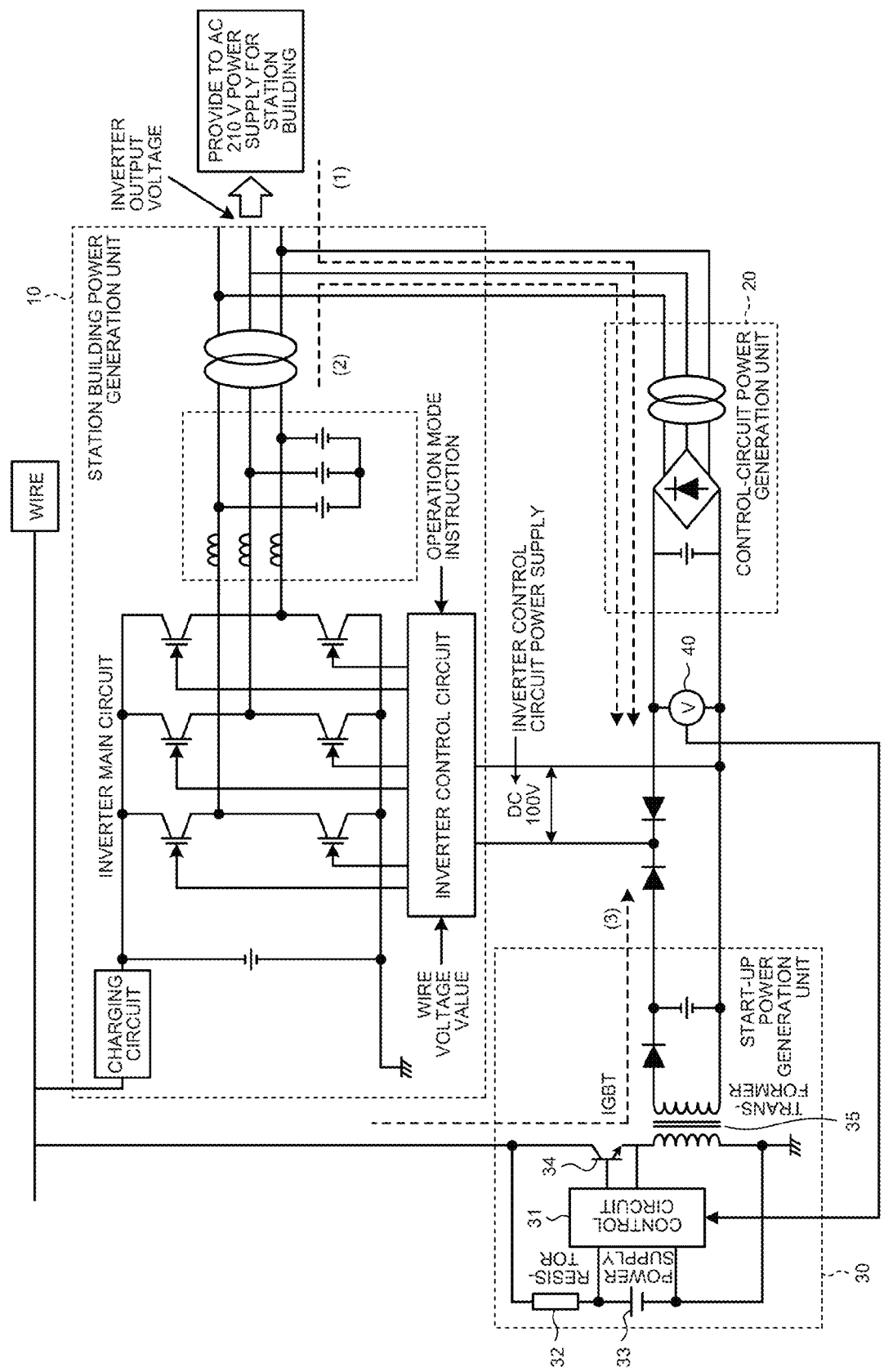

STATION BUILDING POWER SUPPLY DEVICE

FIELD

The present invention relates to a station building power supply device that supplies power to various loads in a station building.

BACKGROUND

Loads (such as lighting devices and air conditioners) in a station building normally operate with power supplied from commercial power supply. However, because it is conceivable that power supply from the commercial power supply is stopped in a case of a power stoppage and the like, the station building power supply device includes a power supply circuit that enables to maintain power supply to the loads in the station building even in a case of emergency such as a power stoppage of the commercial power supply. This power supply circuit includes a main circuit and a control circuit for controlling semiconductors constituting the main circuit. The main circuit receives power supply from an overhead wire carrying a direct current of, for example, 1,500 volts, or 750 volts, converts the power into an alternating current, and then supplies the alternating current to the loads in the station building. The control circuit executes ON and OFF control of the semiconductors of an inverter constituting the main circuit and stops the system upon detecting an abnormality based on the voltage, current, frequency, and the like of the main circuit, for example. Patent Literature 1 discloses an electric-railway power supply apparatus that causes a power regenerative inverter in a power substation to operate as a self-commutated inverter, to thereby supply emergency power when the power supply from commercial power supply to the loads in a station building is stopped.

CITATION LIST

Patent Literature

Patent Literature 1: Japanese Patent Application Laid-open No. S61-251437

SUMMARY

Technical Problem

In Patent Literature 1, a method for supplying power to a control device that controls the power regenerative inverter is not described; however, considering the purpose of obtaining emergency power in a case in which the power supply from commercial power supply is stopped, it is conceivable that the control device for the power regenerative inverter is operated by the power supplied from an overhead wire or from a power storage device such as a battery.

However, in a case of receiving power supply from an overhead wire, the size of a circuit that converts a voltage of, for example, 1,500 volts or 750 volts, to generate a voltage required by the control device becomes large, and this results in a cost increase. Furthermore, in a case of receiving power from the power storage device, because the power storage device is expensive, it not only leads to an increase in cost, but also needs to provide another circuit for charging the power storage device. In addition, it is also necessary to consider the life of the power storage device.

The present invention has been achieved in view of the above problems, and an object of the present invention is to obtain a station building power supply device that can suppress an increase in cost and avoid a size increase of the device.

Solution to Problem

In order to solve the aforementioned problems, a station building power supply device according to one aspect of the present invention is constructed such that it includes: a station building power generation unit including an inverter main circuit and an inverter control circuit to control the inverter main circuit, in which the inverter main circuit converts a voltage supplied from an overhead wire into a voltage required by loads in a station building; a control-circuit power generation unit that converts a voltage supplied to the loads in the station building and generates an input voltage for the inverter control circuit; and an start-up power generation unit that converts a voltage supplied from the overhead wire and generates an input voltage for the inverter control circuit, in a state where the inverter main circuit has stopped the operation and the control-circuit power generation unit has stopped an operation of generating the input voltage for the inverter control circuit.

Advantageous Effects of Invention

According to the present invention, downsizing and cost reduction of the device can be realized.

BRIEF DESCRIPTION OF DRAWING

FIG. 1 shows a configuration example of a station building power supply device.

DESCRIPTION OF EMBODIMENTS

Exemplary embodiments of a station building power supply device according to the present invention will be explained below in detail with reference to the accompanying drawing. The present invention is not limited to the embodiments.

Embodiment

FIG. 1 shows a configuration example of a station building power supply device according to the present invention. The station building power supply device according to the present embodiment includes a station building power generation unit 10 that converts a direct-current voltage supplied from an overhead wire into an alternating-current voltage (for example, AC 210 volts) that is required by loads in a station building, a control-circuit power generation unit 20 that converts the alternating-current voltage output from the station building power generation 10 into a direct-current voltage (for example, DC 100 volts) that is required by an inverter control circuit in the station building power generation unit 10, and a start-up power generation unit 30 that converts a direct-current voltage supplied from the overhead wire into a direct-current voltage required by the inverter control circuit in the station building power generation unit 10 when the station building power generation unit 10 starts a power conversion operation. On the output side of the control-circuit power generation unit 20, a voltage detector 40 is provided. These constituent elements are described below.

(Station Building Power Generation Unit 10)

The station building power generation unit 10 includes, as main constituent elements thereof, a charging circuit, a power storage element, an inverter main circuit, a filter circuit, and a transformer.

In the station building power generation unit 10, the inverter main circuit converts, in accordance with instructions from the inverter control circuit, a direct-current voltage (for example, DC 1,500 volts) that is supplied from the overhead wire via the charging circuit and the power storage element into a three-phase alternating-current voltage, and supplies the three-phase alternating-current voltage to the power supply for a station building via the filter circuit and the transformer. The configuration of the station building power generation unit 10 shown in FIG. 1 is only an example, and any configuration is applicable as long as it can convert power supplied from an overhead wire into power for a station building (power required by loads in a station building). Furthermore, although a case in which the power supplied from the overhead wire is a direct current is explained below, power can be an alternating current.

The inverter control circuit monitors a voltage of an overhead wire (hereinafter, "overhead wire voltage") by a voltage detector (not shown) and, based on the overhead wire voltage (an overhead wire voltage value) and an operation mode instruction signal, executes switching control on semiconductor elements (for example, IGBTs: Insulated Gate Bipolar Transistor) in the inverter main circuit. The operation mode instruction signal is, for example, a signal indicating whether the power supply (AC 210 volts) from commercial power supply to the loads in a station building has been stopped (that is, whether a power stoppage has occurred). When the operation mode instruction signal indicates a power stoppage of the commercial power supply, the inverter control circuit determines that the current mode is a standby power mode, and controls the inverter main circuit such that the inverter main circuit performs power conversion corresponding to the standby power mode. When the operation mode instruction signal does not indicate a power stoppage of the commercial power supply, the inverter control circuit determines that the current mode is a normal mode, and controls the inverter main circuit such that the inverter main circuit performs power conversion corresponding to the normal mode.

In the standby power mode, the inverter control circuit controls the inverter main circuit such that the inverter main circuit continues to perform an operation (hereinafter, "power generating operation for station building") of converting a direct-current voltage supplied from an overhead wire into an alternating-current voltage required by the loads in a station building. On the other hand, in the normal mode, the inverter control circuit controls the inverter main circuit such that the inverter main circuit performs the power generating operation for station building only in a state where an overhead wire voltage is larger than a predetermined threshold, that is, in a state where the overhead wire voltage has been increased by a regenerative power provided to the overhead wire by a running train.

(Control-Circuit Power Generation Unit 20)

The control-circuit power generation unit 20 converts an alternating-current voltage output from the station building power generation unit 10 or an alternating-current voltage (AC 210 volts) supplied from commercial power supply (not shown) (commercial power supply connected to the loads in a station building) into a direct-current voltage (DC 100 volts) for the inverter control circuit in the station building power generation unit 10.

(Start-Up Power Generation Unit 30)

The start-up power generation unit 30 includes, as main constituent elements thereof, a control circuit 31, a resistor 32, a power supply 33, an IGBT 34, and a transformer 35. In the start-up power generation unit 30, the control circuit 31 executes switching control on the IGBT 34 so that a direct-current voltage supplied from the overhead wire is converted into a direct-current voltage (DC 100 volts) for the inverter control circuit in the station building power generation unit 10. The operation of converting a direct-current voltage supplied from the overhead wire into a direct-current voltage for the inverter control circuit is performed when it is detected that no power is being supplied from the control-circuit power generation unit 20 to the inverter control circuit in the station building power generation unit 10. That is, based on a result of detection by the voltage detector 40 provided on the output side of the control-circuit power generation unit 20, the control circuit 31 determines whether power is being supplied from the control-circuit power generation unit 20 to the inverter control circuit in the station building power generation unit 10, and when it is detected that no power is being supplied, the control circuit 31 controls the IGBT 34 such that a direct-current voltage supplied from the overhead wire is converted into a direct-current voltage for the inverter control circuit. The state where no power is being supplied from the control-circuit power generation unit 20 to the inverter control circuit in the station building power generation unit 10 is a state where the station building power generation unit 10 does not perform power the power generating operation for station building, and the power to be supplied from commercial power supply to the loads in the station building is also stopped.

The configuration of the start-up power generation unit 30 shown in FIG. 1 is only an example, and any configuration is applicable as long as it can convert power supplied from the overhead wire into a voltage for the inverter control circuit.

An overall operation of the station building power supply device according to the present embodiment is explained below.

In the station building power supply device, in order to operate the inverter main circuit of the station building power generation unit 10, it is necessary to activate the inverter control circuit for driving the semiconductor elements in the inverter main circuit first. In order to operate the inverter control circuit, power supply (for example, DC 100 volts) is needed, and by providing the control-circuit power generation unit 20 as shown in FIG. 1, power supply of DC 100 volts can be readily provided from an output of the station building power generation unit 10.

When the station building power generation unit 10 is activated from a state where the operation of the inverter main circuit is stopped, an alternating-current voltage (for example, AC 210 volts) is not output from the inverter main circuit (the station building power generation unit 10) at the beginning. At this time, if a power supply (for example, commercial power supply of AC 210 volts transmitted from a power substation) for the station building is present, it is possible that power supply of DC 100 volts is provided from the power supply for the station building to the inverter control circuit via the control-circuit power generation unit 20, and the station building power generation unit 10 is activated (the generating operation for station building is started) (a power supply path denoted by a dashed line (1) in FIG. 1). After the inverter main circuit is activated, an inverter output voltage (AC 210 volts) is output, and the power supply of DC 100 volts for the inverter control circuit is provided from the inverter output voltage (a power supply path denoted by a dashed line (2) in FIG. 1). However, when the power of AC 210 volts (corresponding to the dashed line (1)) mentioned above cannot be supplied due to a power stoppage of power supply for a station building, once the inverter main circuit stops, there will be no input power supplied from the control-circuit power generation unit 20 to the inverter control circuit, and the station building power generation unit 10 becomes unable to be activated. As a result, it is made impossible to shift to an operation in the standby power mode in which the station building power generation unit 10 supplies power as emergency power supply for a train station in a case of a power stoppage.

In order to solve this problem, the station building power supply device according to the present embodiment includes the start-up power generation unit 30 that directly generates power supply of DC 100 volts from an overhead wire voltage with the use of a DC-DC converter. Specifically, when the power supply for a station building is stopped due to a power stoppage and the inverter main circuit of the station building power generation unit 10 is also stopped, the power supply of DC 100 volts for the inverter control circuit is provided by the start-up power generation unit 30 (a power supply path denoted by a dashed line (3) in FIG. 1). Following the start of operation of the inverter control circuit, the inverter main circuit starts operating, and the inverter output voltage of the station building power generation unit 10 is output, so that the output of the power supply of DC 100 volts from the control-circuit power generation unit 20 starts. Accordingly, even in a case of a power stoppage in the station building, the inverter main circuit can be activated and after this activation, the power generating operation for station building can be continued. Therefore, there is no problem even if the start-up power generation unit 30 stops the operation of generating the power supply of DC 100 volts for the inverter control circuit (the power supply denoted by the dashed line (3) ends) after the output of the power supply of DC 100 volts from the control-circuit power generation unit 20 is started.

As described above, after the inverter main circuit starts operating and the inverter output voltage is output, the power supply (DC 100 volts) for the inverter control circuit is provided from the control-circuit power generation unit 20, so that the power supply from the start-up power generation unit 30 is no longer necessary. Therefore, the voltage detector 40 detects whether the inverter control circuit is being supplied with DC 100 volts, and upon detection of this DC 100 volts being supplied, the start-up power generation unit 30 ends the operation of providing the power supply of DC 100 volts to the inverter control circuit. Normally, the time required for the inverter main circuit to operate and supply the inverter output voltage after the inverter control circuit is turned ON is about several seconds. Therefore, it will be sufficient if the start-up power generation unit 30 operates only during that time (in other words, it suffices that the operation of providing the power supply of DC 100 volts to the inverter control circuit is performed). There may be a case in which the inverter main circuit of the station building power generation unit 10 is unable to be activated due to a malfunction and the like, and thus an inverter output voltage is not output. Accordingly, when the activation of the inverter main circuit of the station building power generation unit 10 is not detected (the voltage detector 40 does not detect DC 100 volts) even after a predetermined time (for example, 10 seconds) has passed following the start of the operation of providing the power supply of DC 100 volts to the inverter control circuit, the start-up power generation unit 30 determines that there is a malfunction and ends the operation of providing the power supply of DC 100 volts. A display panel or the like may be provided to give a notice of a malfunction to outside when it is determined that there is such a malfunction.

With a configuration in which the start-up power generation unit 30 generates power supply of DC 100 volts for the inverter control circuit only during the period since the station building power generation unit 10 is activated and an inverter output voltage (AC 210 volts) is output until DC 100 volts is output from the control-circuit power generation unit 20, the loss of a switching device (the IGBT 34) used for the DC-DC converter can be minimized, and accordingly a cooler (not shown) can be also downsized. Further, the transformer 35 does not need to constantly provide power supply to the inverter control circuit and therefore the output capacity can be suppressed, and thus downsizing and cost reduction thereof can be realized. For the above reasons, the downsizing and cost reduction of the start-up power generation unit 30 can be realized. Because the execution time of the operation by the start-up power generation unit 30 to generate power supply of DC 100 volts for the inverter control circuit is limited to less than a predetermined time (for example, less than 10 seconds), the start-up power generation unit 30 can be prevented from undesirably operating over long hours even in a state where the station building power generation unit 10 or the control-circuit power generation unit 20 has a malfunction, so that the start-up power generation unit 30 can be downsized and it is made possible to prevent the start-up power generation unit 30 itself from malfunctioning.

It is also possible that the power supply for the inverter control circuit is constantly generated only by the start-up power generation unit 30. In this case, the control-circuit power generation unit 20 becomes unnecessary. However, in order to directly convert a high voltage into a direct current, the switching loss of the switching element on the primary side in the start-up power generation unit 30 becomes large and the switching element is required to have greater current capacity. This causes such problems that the element becomes expensive and the cooler becomes large. Meanwhile, the power supply (corresponding to the control-circuit power generation unit 20) for generating DC 100 volts from AC 210 volts can be used for various occasions and is inexpensive. Therefore, the downsizing and cost reduction of the device can be realized by using the control-circuit power generation unit 20 as much as possible to generate power supply for the inverter control circuit, and shortening the time in which the power supply (the start-up power generation unit 30) is used for generating power for the inverter control circuit directly from power supplied from the overhead wire.

As described above, in the station building power supply device according to the present embodiment, the start-up power generation unit 30 is configured to perform the operation of converting a direct-current voltage supplied from the overhead wire into a direct-current voltage for the inverter control circuit of the station building power generation unit 10 in a state where the station building power generation unit 10 does not perform the power generating operation for station building and the control-circuit power generation unit 20 does not generate the direct-current voltage for the inverter control circuit in the station building power generation unit 10 due to a power stoppage of commercial power supply, that is, in a state where the voltage detector 40 has not detected DC 100 volts. Consequently, even when power supply from the commercial power supply is stopped in a state where the station building power generation unit 10 does not generate power supply for a station building, it is possible to activate the station building power generation unit 10 to provide emergency power to the loads in a station building. Furthermore, because the start-up power generation unit 30 generates a direct-current voltage for the inverter control circuit only in a short time for activating the station building power generation unit 10, the downsizing and cost reduction of the device can be realized.

INDUSTRIAL APPLICABILITY

As described above, the present invention is useful in a railway system as a station building power supply device that is capable of generating emergency power using power supplied from an overhead wire and supplying the emergency power to loads in a station building in a case of a power stoppage of commercial power supply.

REFERENCE SIGNS LIST

10 station building power generation unit, 20 control-circuit power generation unit, 30 start-up power generation unit, 31 control circuit, 32 resistor, 33 power supply, 34 IGBT, 35 transformer, 40 voltage detector.

The invention claimed is:

1. A station building power supply device comprising:
 a station building power generator including an inverter main circuit and an inverter control circuit to control the inverter main circuit, in which the inverter main circuit converts a voltage supplied from an overhead wire into a voltage required by loads in a station building;
 a control-circuit power generator that converts a voltage supplied to the loads in the station building and generates an input voltage for the inverter control circuit; and
 a start-up power generator that converts a voltage supplied from the overhead wire and generates an input voltage for the inverter control circuit, in a state where operation of the inverter main circuit has stopped and the control-circuit power generator has stopped an operation of generating the input voltage for the inverter control circuit,
 wherein the start-up power generator stops an operation of generating the input voltage for the inverter control circuit when detecting that the control-circuit power generator has started the operation of generating the input voltage for the inverter control circuit.

2. The station building power supply device according to claim 1, wherein the start-up power generator stops the operation of generating the input voltage for the inverter control circuit when a predetermined time has passed after the start-up power generator has started to generate the input voltage for the inverter control circuit without detecting that the control-circuit power generator has started the operation of generating the input voltage for the inverter control circuit.

3. The station building power supply device according to claim 1, wherein the start-up power generator stops the operation of generating the input voltage for the inverter control circuit when a predetermined time has passed after the start-up power generator has started to generate the input voltage for the inverter control circuit without detecting that the control-circuit power generator has started the operation of generating the input voltage for the inverter control circuit.

4. The station building power supply device according to claim 1, wherein the input voltage for the inverter control circuit is generated by the start-up power generator based on the voltage supplied from the overhead line and received by the start-up power generator.

5. The station building power supply device according to claim 1, wherein the input voltage for the inverter control circuit is generated by the control-circuit power generator based on the voltage supplied to the loads in the station building.

6. The station building power supply device according to claim 1, wherein the start-up power generator and the control-circuit power generator are both connected to the inverter control circuit by a common pathway.

7. The station building power supply device according to claim 1, wherein the start-up power generator and the control-circuit power generator are connected to each other by two pathways.

8. The station building power supply device according to claim 7, wherein the two pathways are also connected to the inverter control circuit.

* * * * *